E. G. THOMAS.
RUBBING POST.
APPLICATION FILED SEPT. 4, 1914.
1,180,803.
Patented Apr. 25, 1916.
2 SHEETS—SHEET 2.
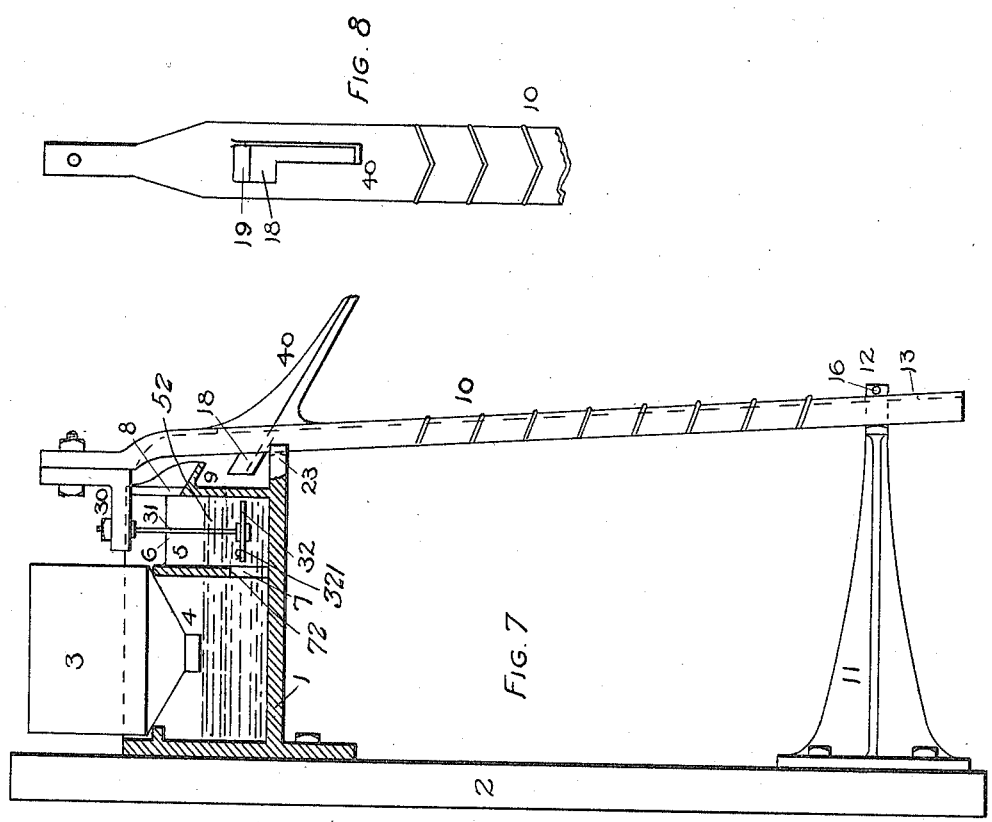
WITNESSES
Mabel O. Thomas
Arthur E. Holt
INVENTOR
Edward G. Thomas

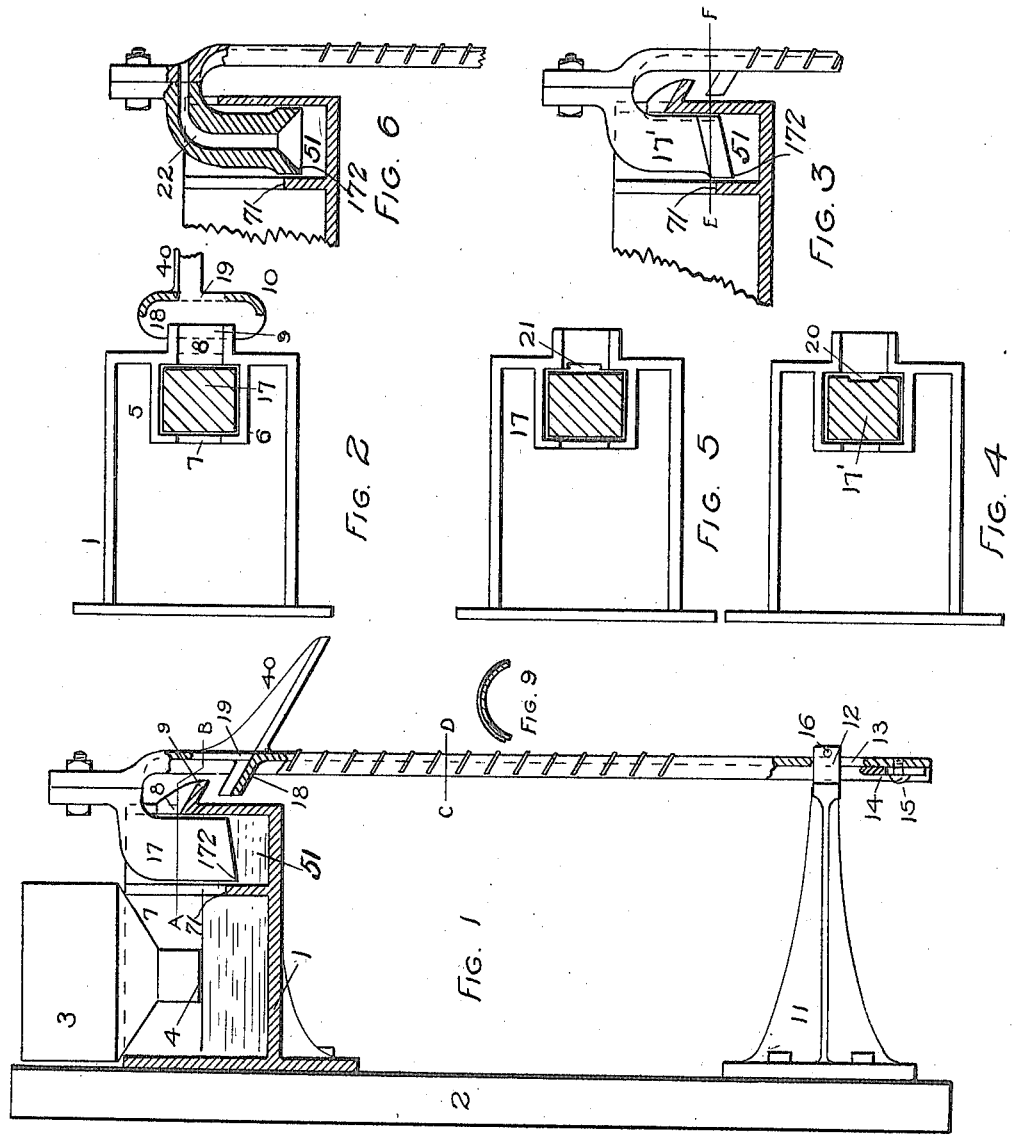

UNITED STATES PATENT OFFICE.

EDWARD G. THOMAS, OF KEWANEE, ILLINOIS.

RUBBING-POST.

1,180,803.   Specification of Letters Patent.   Patented Apr. 25, 1916.

Application filed September 4, 1914. Serial No. 860,186.

*To all whom it may concern:*

Be it known that I, EDWARD G. THOMAS, a citizen of the United States, residing at Kewanee, in the county of Henry and State of Illinois, have invented a new and useful Rubbing-Post, of which the following is a specification.

My invention relates to improvements in that class of apparatus which are intended to accomplish the transfer of a medicinal or insecticidal liquid from a tank or other source of supply to the skin of an animal for the purpose of ridding it of the vermin which live upon it. These rubbing posts are chiefly used in connection with the raising of hogs and my further description of the apparatus will refer only to this use of the machine, but the device when suitably modified, can be used by other animals.

The object of my improvement is first to simplify the mechanical construction of the machine; second, to avoid the use of any form of valve; and third, to provide a device which will not require adjustment under the various conditions of temperature which it will encounter in its use.

In the drawings which accompany and form a part of these specifications Figure 1 is a side view in partial section of one form of construction of my device; Fig. 2 is a plan view of the tank of the machine, the reservoir having been removed; the rubbing strip and attached parts being sectioned along the line A—B; Fig. 3 illustrates a slight modification in construction in which a passageway for the ready egress of the liquid is provided; Fig. 4 is a plan view of the machine in which the plunger shown in Fig. 3 is shown here in section on the line E—F; Fig. 5 is a plan view of the tank with a similarly sectioned plunger showing another location for the passageway for the egress of the liquid; Fig. 6 is a sectioned view of a portion of the tank and operative parts of the device in which is illustrated another method of providing a passageway for the egress of the liquid; Fig. 7 is a side view in partial section of my machine illustrating a variation in the construction of the operative parts of the apparatus; Fig. 8 is a front view of a part of the rubbing strip; and Fig. 9 is a section along the line C—D of the rubbing strip.

Similar numbers on the drawings and in the description refer to similar parts.

My machine consists, in its simplest form, of a tank containing the liquid to be distributed, suitably supported above the level of the highest point at which it is desired to deliver oil to the animal. A rubbing strip extending toward the ground from the tank is provided against which the animal in his search for something to relieve the itching of his skin will rub and which will move if the strip is so supported as to permit motion. An orifice is located in the side of the tank above the level of the liquid therein and the motion imparted to the rubbing strip by the animal is made use of to momentarily raise the level of the liquid in the tank adjacent to the orifice above the edge thereof so that a portion of the liquid will flow out through the orifice whence it is guided to fall upon or otherwise come into contact with the skin of the animal.

In Fig. 1 a tank 1 is secured to a frame 2. As the tank is of somewhat limited capacity a reservoir 3 consisting of a can having an opening 4 which, in the operative position of the reservoir, points downward within the tank is located at the height at which it is desired to keep the level of the liquid in the tank 1. The liquid in the reservoir will be retained therein by atmospheric pressure as long as the level of the liquid in the tank is above the opening 4 of the reservoir, but will flow from the reservoir into the tank when the level of the liquid in the latter becomes low enough to allow air to pass into the reservoir through the opening 4. In this manner the level of the liquid in the tank will be kept at the desired level.

A chamber 5 is formed in the front of the tank 1 by the walls 6 in which an opening 7 is provided. The lower or operative edge 71 of opening 7 is below the level of the liquid but above the bottom of chamber 5, so that the part of chamber 5 below the opening 7 constitutes a submerged inclosure 51. The level of the liquid in chamber 5, when the device is at rest will be the same as that of the liquid in the tank so that the inclosure 51 will at all times be flooded. The upper part of chamber 5 serves as a guide for the plunger, whether the lower part of the plunger is within or without the inclosure 51. In the front of chamber 5 an opening or orifice 8 is located extending through the side of the tank, and having its lower edge located above the level of the liquid in the tank but below the edge of the tank at other points in its periphery. The edge of orifice 8 is extended to form a downwardly sloping spout 9.

A rubbing strip 10 of section similar to Fig. 9 is erected in front of tank 1 and opposite chamber 5. At its lower end the rubbing strip registers with and is retained and guided by guide-bracket 11. A part 12 of the guide bracket projects through an opening 13 in rubbing strip 10 and serves to limit the vertical motion permitted to the rubbing strip. The amount of this vertical motion is adjusted by a slotted adjusting block 14 secured to the rubbing strip by screw 15. A pin 16 driven through the projecting end of part 12 prevents the rubbing strip 10 from becoming disengaged from guide bracket 11.

To the top of the rubbing strip 10 is secured a piston having the form of a plunger 17 of slightly smaller section than the interior of chamber 5 and located therein and serving, among its functions, to guide the upper end of the rubbing strip as it is moved by the animal. The edge 172 of the lower face of plunger 17 which is opposite to and registers with the operative edge 71 of opening 7 will be termed its operative edge, inasmuch as the relation between these edges has an essential bearing on the operation of the machine.

A shelf 18 sloping downward toward the front of the strip projects from the rear of rubbing strip 10 beneath spout 9 so that any liquid dripping from the spout will fall upon shelf 18 and will run through an opening 19 in the rubbing strip to the front surface of the strip and thence downward along its surface to the skin of the animal in contact with it. On the front of the rubbing strip are placed a number of projecting ribs designed to retard the flow of oil down the strip and to render the surface much more rough, so that it may more readily be moved by the animal as it rubs and give more satisfaction to the animal.

The operation of the apparatus as above described is as follows: The animal, in rubbing against the strip 10, will move it up and down to the extent permitted by the relation between part 12 of guide bracket 11 and adjusting block 14. These parts are so adjusted that when the rubbing strip is in its highest position operative edge 172 of plunger 17 will be above operative edge 71 of opening 7 and when the rubbing strip is in its lowest position edge 172 will be below edge 71. When plunger 17 is raised to its highest point the liquid in tank 1 will flow through opening 7 into chamber 5 and inclosure 51 so that the space below the plunger as well as the space surrounding it will be filled to the level of the liquid in the tank. When the plunger is forced downward by the action of the animal against the rubbing strip to such an extent that the operative edge 172 of plunger 17 is opposite edge 71 of opening 7, this opening will be practically closed and the liquid remaining in the inclosure 51 will not be able to escape readily into the tank and will be spurted up, during the further downward progress of the plunger 17, through the narrow spaces between the outside of the plunger 17 and the walls 6 of chamber 5 to a height considerably greater than the general level of the liquid in the tank. That which rises in the space between the front of plunger 17 and the wall of chamber 5 containing orifice 8 will rise above the edge of the orifice and a part of it will flow outwardly through this orifice. The liquid in the other spaces around the plunger will also be more or less raised to an amount dependent on the relative ease of escape back into the tank through the opening in the rear wall of chamber 5 and the proportion of the parts. Should any of the liquid be driven higher than the top edge of the walls of the chamber, it will fall again into the tank without any harm being done. The liquid, however, which has passed out through orifice 8 will flow down the spout 9, drip upon shelf 18 and run out upon the front surface of the rubbing strip 10. This action will be repeated every time the strip is raised and lowered by the rubbing animal so that a steady succession of small amounts will be delivered to the front of the rubbing strip and the itching animal. As soon as the animal ceases scratching and the apparatus comes to rest, however, any of the liquid which may remain around the plunger in chamber 5 above the level of the liquid in the tank will at once run back into the tank until a common level is restored throughout the tank and chamber, as there are no valves or other devices for retaining the liquid in an elevated position and no liquid will be raised above the tank level except when splashed upward by the motion of the plunger.

In order to produce a greater rise in the height of the liquid on the front side of the plunger, where it is desired, than on the other sides, a channel or passageway 20 may be made in the front surface of the plunger 17' as is shown in Figs. 3 and 4 or such a channel may be formed in the front wall of chamber 5 as is illustrated at 21 in Fig. 5, while as a further means of preventing the rise of the liquid on the sides and rear of the plunger 17' these parts may be reduced so as to increase the space between the plunger and the walls of chamber 5. If desired the passageway may be formed wholly within the plunger as is illustrated at 22 in Fig. 6 or wholly within the walls of the tank. In any case the exit opening of the passageway or orifice must be above the level of the liquid in the tank 1, so that the liquid will only flow from it when the level at the opening has been momentarily raised by the motion of the plunger.

In Figs. 1, 2, 3, 4, 5 and 6 the rise in the level of the liquid at the orifice is produced by the downward motion of a member attached to the rubbing strip.

In Figs. 7 and 8 a modification of construction is shown in which the same momentary rise in level at the orifice is produced by the upward motion of a member attached to the rubbing strip.

In these figures reference numerals 1 to 16 refer to similar parts to those in Figs. 1 and 2. The construction of tank 1 in Figs. 7 and 8 varies from that of Figs. 1 and 2 in that the rear wall of chamber 5 instead of having an opening extending downwardly from its top to a point near the bottom, has an opening 7 at the bottom which has its upper or operative edge 72 below the level of the liquid in the tank and that portion of chamber 5 lying between said operative edge 72 of opening 7 and the level of the liquid forms a submerged inclosure 52 which will be filled with liquid up to the level of the liquid in the tank. The tank 1 also has a projection 23 serving as an upper guide for the rubbing strip and the piston is of a different form from the ones previously described.

To the top of rubbing strip 10 is fastened a bracket 30 and firmly secured in a pendant position below the bracket is a rod 31 supporting a lifting plate 32. The upper edge 321 of plate 32 is its operative edge and when the rubbing strip 10 is in its lowest position the operative edge is below the operative edge 72 of opening 7 so that the liquid can readily flow into inclosure 52 and fill it up to the level of the liquid in the tank. The lifting plate is only slightly less in size than the internal area of inclosure 52 and when the rubbing strip 10 is raised above the point where the operative edges 72 and 321 coincide in elevation the liquid above the lifting plate will not be able to readily escape back into tank 1 around the edges of plate 32 and more or less of it will be lifted up above the level of the orifice 8 and a part of this will flow out of the orifice. The remainder will follow the lifting plate downward when it again drops to the bottom of chamber 5 or, if raised high enough, may flow over the side and rear walls of chamber 5 back into tank 1.

It is not necessary that either the plunger or lifting plate should be a close fit in the chamber 5, since the action of an animal in rubbing is quick and energetic and a very considerable rise of liquid in the area adjacent to the exit orifice is readily produced with only an approximate agreement between the shape of the moving members and the inclosing chamber.

It is practically impossible for an animal to rub the center of its back against a vertical rubbing strip and yet it is desirable that this part of the animal shall receive an application of the insecticidal fluid. I therefore provide a spout 40, projecting forward from the front surface of the rubbing strip 10 and shown in Figs. 1, 2, 7 and 8. This spout is arranged to receive a part of the liquid delivered to the rubbing strip, since its upper surface registers with opening 19. The outer end of spout 40 from which the liquid will drip is located at a distance from the front of rubbing strip 10 assumed to be approximately equal to the distance from the rubbing strip to the center of the animal's back as it stands in contact with the rubbing strip. Since this distance will vary between large and small animals the rubbing strip may be inclined forward toward its lower end as is shown in Fig. 7 and the center of the back of a small animal will thus be brought into about the same vertical line as that of a larger one as they stand in contact with the rubbing strip.

In apparatus of this class in which valves are employed it has been found necessary to adjust the valves so that they will be opened more in winter when the liquid is cold and sluggish than in summer when the liquid has been thinned by the heat and will flow freely. With my device such adjustment will be unnecessary as the same volume will at all times be displaced without regard to its consistency. It has been found difficult to keep the valves used in good working condition so that the entire absence of valves in my apparatus is an important and advantageous feature.

My device may be modified in many structural respects and by the substitution of mechanical equivalents for any of the parts of the mechanism without thereby altering its essential operation. Such modification will readily occur to those skilled in the mechanic arts and I have not deemed it necessary to illustrate them here.

I claim as my invention the following:

1. In a rubbing post the combination of a tank arranged to receive liquid, a rubbing strip, a downwardly inclined bar projecting forward to a point approximately over the center of the cross section of the animal at the point of contact of the animal with the rubbing strip and means operated by movement of said strip for delivering liquid from the tank to both rubbing strip and bar.

2. In a rubbing post the combination of a receptacle arranged to receive liquid and having an exit opening above the level of the liquid therein, and means adapted to be actuated by the up and down rubbing of animals for ejecting liquid through said opening.

3. In a rubbing post the combination of a receptacle arranged to receive liquid, a rubbing strip arranged to be vertically reciprocated by the rubbing of animals, means operatively connected to said strip for splashing liquid over the edge of said receptacle, and means for guiding said liquid onto said rubbing strip.

4. In a rubbing post the combination of a receptacle arranged to receive liquid, a vertically movable rubbing strip and means operatively connected with said strip adapted to splash liquid over the edge of the receptacle.

5. In a rubbing post, the combination of a tank arranged to receive liquid, a chamber adjacent thereto and connected therewith by an unobstructed passageway below the level of the liquid, a vertically reciprocable rubbing strip arranged to be actuated by animals, means controlled by the movement of said strip for intermittently displacing the liquid in said chamber and obstructing said passageway, and means for delivering the ejected liquid to said rubbing strip.

6. In a rubbing post the combination of a receptacle arranged to receive liquid and a vertically-movable liquid-feeding device comprising two members arranged to straddle the edge of said receptacle, one member constituting a liquid-moving instrumentality and the other member being located outside said receptacle and constituting a rubbing strip.

7. In a rubbing post the combination of a tank arranged to receive liquid, a submerged inclosure associated therewith, and a liquid-feeding device consisting of two members arranged to straddle the wall of said inclosure; one member consisting of a plunger adapted to enter said inclosure and the other member constituting a rubbing strip.

8. In a rubbing post the combination of a receptacle arranged to receive liquid and a liquid-feeding device in the form of an inverted J and arranged to straddle the edge of the receptacle, the shorter member of the J constituting a liquid-moving instrumentality and being located within the receptacle and the longer member of the J forming a rubbing strip and being located outside the receptacle.

9. The combination with a suitable support, of a bracket supported thereby, an oil receptacle supported above said bracket, and a rubbing strip having a piston at its upper end movable in said receptacle, said piston and hence the upper end of said rubbing strip being guided by said receptacle, the lower end of said strip having sliding engagement with said bracket.

10. In a device of the class described, a receptacle for oil having an opening therein, a lip below said opening, a vertically movable rubbing strip adjacent to said opening having an opening therethrough, means operated by said strip for ejecting oil from said receptacle, a lip on the rear side at said opening and below said first mentioned lip whereby the oil which flows from said first opening is guided by said lips through said second opening and flows down the front of said strip.

11. The combination with a suitable support, of a bracket supported thereby, an oil receptacle supported above said bracket, a reciprocable rubbing strip having a piston at its upper end, said piston and hence the upper end of said rubbing strip being guided by said receptacle during reciprocation, the lower end of said strip having sliding engagement with said bracket, means for limiting the reciprocating movement of said strip and means for directing the oil, which is displaced from said receptacle by the movement of said piston, to the operating surface of said rubbing strip.

12. In a rubbing post, the combination of a receptacle arranged to receive liquid and means adapted to be moved first in one direction and then in the other by the rubbing of animals for splashing liquid over an edge of said receptacle.

EDWARD G. THOMAS.

Witnesses:
ARTHUR E. HOLT,
WILLIAM W. CALHOUN.

Copies of this patent may be obtained for five cents each, by addressing the "Commissioner of Patents, Washington, D. C."